US012518229B2

(12) United States Patent
Gupta et al.

(10) Patent No.: US 12,518,229 B2
(45) Date of Patent: Jan. 6, 2026

(54) WORKFLOW EXTRACTION AND EXECUTION BASED ON ENCODED FLOW GRAPHS

(71) Applicant: International Business Machines Corporation, Armonk, NY (US)

(72) Inventors: Monika Gupta, Gurugram (IN); Sampath Dechu, Bangalore (IN); Hussain Jagirdar, Ujjain (IN); Akansha Khanna, Bangalore (IN); Naveen Eravimangalath Purushothaman, Thrissur (IN)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 17/677,257

(22) Filed: Feb. 22, 2022

(65) Prior Publication Data
US 2023/0267396 A1 Aug. 24, 2023

(51) Int. Cl.
*G06Q 10/0633* (2023.01)
*G06N 20/00* (2019.01)

(52) U.S. Cl.
CPC ......... *G06Q 10/0633* (2013.01); *G06N 20/00* (2019.01)

(58) Field of Classification Search
CPC ......... G06Q 10/0633; G06Q 10/06316; G06Q 10/0631; G06Q 10/067; G06Q 10/103
See application file for complete search history.

(56) References Cited

U.S. PATENT DOCUMENTS 7,580,911 B2 * 8/2009 Sun ..................... G06Q 10/103
706/50
8,265,979 B2 * 9/2012 Golani .................. G06Q 10/10
705/7.27

(Continued)

FOREIGN PATENT DOCUMENTS

IN 201841032619 A 3/2020

OTHER PUBLICATIONS

Chambers, Alexander J. et al., Automated Business Process Discovery from Unstructured Natural Language Documents BPM Workshops, 2020 (Year: 2020).*

(Continued)

*Primary Examiner* — Scott L Jarrett
(74) *Attorney, Agent, or Firm* — Ryan, Mason & Lewis, LLP

(57) ABSTRACT

Methods, systems, and computer program products for generating automation recommendations for ad hoc processes are provided herein. A computer-implemented method includes obtaining workflow data comprising descriptions associated with one or more dynamic processes; creating event logs based at least in part on the descriptions; applying a graph extraction process to derive process flow graphs from the created event logs; generating embeddings of the process flow graphs, wherein the embeddings encode at least one of: one or more structural features and one or more attribute features of the process flow graphs; and identifying at least one of the process flow graphs to be automated based on the generated embeddings; and outputting the identified at least one process flow graph to at least one of: a user and a robotic process automation tool.

20 Claims, 7 Drawing Sheets

(56) References Cited

U.S. PATENT DOCUMENTS

| | | | | |
|---|---|---|---|---|
| 8,321,251 | B2* | 11/2012 | Opalach | G06Q 10/06 |
| | | | | 705/7.42 |
| 8,688,499 | B1* | 4/2014 | Bose | G06Q 10/00 |
| | | | | 705/7.27 |
| 9,087,236 | B2* | 7/2015 | Dhoolia | G06V 30/422 |
| 9,799,326 | B2* | 10/2017 | Dhoolia | G06N 5/04 |
| 10,523,520 | B2* | 12/2019 | Aggarwal | H04L 63/1425 |
| 10,656,979 | B2* | 5/2020 | Ishakian | G06F 16/9024 |
| 11,200,539 | B2* | 12/2021 | Iyer | G06Q 10/0633 |
| 11,270,241 | B2* | 3/2022 | Smutko | H04M 3/5175 |
| 11,500,756 | B2* | 11/2022 | Scheepens | G06Q 10/06 |
| 11,710,098 | B2* | 7/2023 | Sridhara | G06N 20/00 |
| | | | | 706/12 |
| 11,748,682 | B2* | 9/2023 | Smutko | H04M 3/5175 |
| | | | | 705/7.27 |
| 11,816,596 | B2* | 11/2023 | Pingali | G06N 3/04 |
| 2004/0260590 | A1* | 12/2004 | Golani | G06Q 10/10 |
| | | | | 705/7.26 |
| 2010/0042745 | A1* | 2/2010 | Maeda | G06Q 10/06 |
| | | | | 709/242 |
| 2012/0059683 | A1* | 3/2012 | Opalach | G06Q 10/0633 |
| | | | | 705/7.27 |
| 2012/0062574 | A1* | 3/2012 | Dhoolia | G06V 30/422 |
| | | | | 345/506 |
| 2014/0304027 | A1* | 10/2014 | Wu | G06Q 10/0633 |
| | | | | 705/7.27 |
| 2014/0350983 | A1* | 11/2014 | Lakshmanan | G06Q 10/063114 |
| | | | | 705/7.15 |
| 2017/0111245 | A1* | 4/2017 | Ishakian | G06Q 10/0633 |
| 2017/0213544 | A1* | 7/2017 | Dhoolia | G10L 15/22 |
| 2017/0286190 | A1* | 10/2017 | Ishakian | G06F 9/542 |
| 2018/0114126 | A1* | 4/2018 | Das | G06F 16/335 |
| 2020/0065151 | A1* | 2/2020 | Ghosh | G06F 40/295 |
| 2021/0004711 | A1* | 1/2021 | Gupta | G06N 5/02 |
| 2021/0216925 | A1* | 7/2021 | Dixit | G06Q 10/06311 |
| 2021/0264332 | A1* | 8/2021 | Pingali | G06N 5/022 |
| 2021/0304139 | A1* | 9/2021 | Sridhara | G06F 40/30 |
| 2021/0406228 | A1* | 12/2021 | Reminnyi | G06F 16/26 |
| 2022/0075705 | A1* | 3/2022 | Scheepens | G06N 5/01 |
| 2022/0075706 | A1* | 3/2022 | Scheepens | G06F 11/3409 |
| 2022/0076147 | A1* | 3/2022 | Scheepens | G06F 11/3495 |
| 2022/0188143 | A1* | 6/2022 | Scheepens | G06N 3/08 |

OTHER PUBLICATIONS

Khameme, Fatemeh Nikraftar, Recommender System Based on Process Mining University di Padova, Italy, 2022 (Year: 2022).*

Hugo et al., Business Process Models Clustering Based on Multimodal Search, K-means clustering and Cumulative and Non-Continuous N-Grams, Polibits, vol. 54, 2016 (Year: 2016).*

Cao, Bin et al, Graph-Based Workflow Recommendation: On Improving Business Process Modeling CIKM'12, ACM, Oct.-Nov. 2012 (Year: 2012).*

Wang, Huaqing et al., RLRecommender: A Representation-Learning-Based Recommendation Method for Business Process Modeling, ICSOC 2-18, Spring Nature, AG 2018 (Year: 2018).*

Yu, Xiaoming et al., Workflow Recommendation Based on Graph Embedding 2020 IEEE World Congress on Services, 2020 (Year: 2020).*

Mell, Peter, et al., The NIST Definition of Cloud Computing, National Institute of Standards and Technology, U.S. Department of Commerce, NIST Special Publication 800-145, Sep. 2011.

Gupta, Monika, et al. "Analyzing comments in ticket resolution to capture underlying process interactions." International Conference on Business Process Management, Springer, Cham, 2020, pp. 219-231.

Dustdar, Schahram, et al. "Mining of ad-hoc business processes with TeamLog." Data & Knowledge Engineering 55.2, Nov. 1, 2005, pp. 129-158.

Dorn, Christoph, et al. "Self-adjusting recommendations for people-driven ad-hoc processes." International conference on business process management. Springer, Berlin, Heidelberg, Sep. 13, 2010, pp. 327-342.

Augusto, Adriano, et al. "Split miner: automated discovery of accurate and simple business process models from event logs." Knowledge and Information Systems 59.2, May 2019, pp. 251-284.

Augusto, Adriano, et al. "Automated discovery of process models from event logs: review and benchmark." IEEE transactions on knowledge and data engineering 31.4, May 2018, pp. 686-705.

Bolt, Alfredo, et al., "Finding process variants in event logs."OTM Confederated International Conferences" On the Move to Meaningful Internet Systems", Springer, Cham, Oct. 2017, pp. 45-52.

Nguyen, Phuc, et al. "TabEAno: Table to Knowledge Graph Entity Annotation." arXiv preprint arXiv:2010.01829, Oct. 2020.

Motahari-Nezhad, et al. "Next best step and expert recommendation for collaborative processes in it service management." International Conference on Business Process Management. Springer, Berlin, Heidelberg, Aug. 2011, pp. 50-61.

Albalawi, Rania, Tet Hin Yeap, and Morad Benyoucef. "Using topic modeling methods for short-text data: A comparative analysis." Frontiers in Artificial Intelligence, vol. 3, Article 42, Jul. 2020.

Cirne, Renato, et al. "Data Mining for Process Modeling: A Clustered Process Discovery Approach." 2020 15th Conference on Computer Science and Information Systems (FedCSIS), IEEE, Sep. 2020, pp. 587-590.

Process discovery by using Discovery Bot, Automation Anywhere, Inc., available at https://docs.automationanywhere.com/bundle/enterprise-v2019/page/discovery-bot/topics/discovery-bot-intro.html#, last visited Feb. 22-Feb. 2022, last updated: Jan. 21, 2022.

* cited by examiner

WORKFLOW EXTRACTION AND EXECUTION BASED ON ENCODED FLOW GRAPHS

BACKGROUND

The present application generally relates to information technology and, more particularly, to automation tools.

Process automation software tools (such as business process management (BPS) software) attempt to automate repetitive tasks, manage fundamental processing, and process logics. Such tools are typically designed to handle predefined tasks and/or workflows.

SUMMARY

In one embodiment of the present disclosure, techniques are provided for generating automation recommendations for ad hoc processes. An exemplary computer-implemented method includes: obtaining workflow data comprising descriptions associated with one or more dynamic processes; creating event logs based at least in part on the descriptions; applying a graph extraction process to derive process flow graphs from the created event logs; generating embeddings of the process flow graphs that encode one or more features of the process flow graphs; identifying at least one of the process flow graphs to be automated based at least in part on the generated embeddings; and outputting the identified at least one process flow graph to at least one of: a user and a robotic process automation tool.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Process mining and RPA (robotic process automation) are tools often used for identifying and automating repetitive and mundane tasks in workflows. Generally, existing process mining tools work on event logs from workflow tools, where each event log typically includes a case identifier (ID), an activity, and a timestamp. Process mining tools discover as-is processes from structured event logs and provide visualizations for users to identify process bottlenecks. Such tools can provide a way for agents to record activity, (for example, clicks and key board entries) so that repetitive tasks can be identified, and the activity can be used in RPA implementations, for example.

Existing automation tools typically discover automation opportunities using a manual process based on task recorders and process mining. For example, after a set of tasks has been recorded, a user manually maps the tasks to task names. Then, multiple task recordings are manually aggregated to identify repeatable tasks for automation. As an example, consider the output for a rejected invoices process includes Task 1 (T1)—download invoice; Task 2 (T2)—update status at time T2; and Task (T3)—send email. T1, T2, and T3 can then be automated with a robotic process automation (RPA) process, for example.

Ad hoc processes generally refer to processes that are not predefined. In such processes, tasks are created, assigned, and performed dynamically while the process is being executed, for example. As an example, a ticketing system can include software that enables users to create, track, and maintain a list of issues as tickets. Such a system can track task lifecycles (for example, using statuses such as open, assigned, waiting, closed, etc.), where a ticket can include a ticket description and one or more task descriptions. Such descriptions can be considered "ad hoc" as they are not predefined.

Process mining tools do not currently handle ad hoc processes and task descriptions. Additionally, identifying activities and sub-processes which can be used for automation (for example, RPA) is performed manually. Since ad hoc workflow tools are used by multiple teams (for example, development and operations), it is often time consuming to segregate insights for bottlenecks and automation opportunities for each team.

As described herein, an exemplary embodiment includes automating automation recommendations for ad hoc processes. Such embodiments can include performing an automation amenability ranking of process topics using structural and statistical features of attributed topical process flow graphs.

Figure 1:
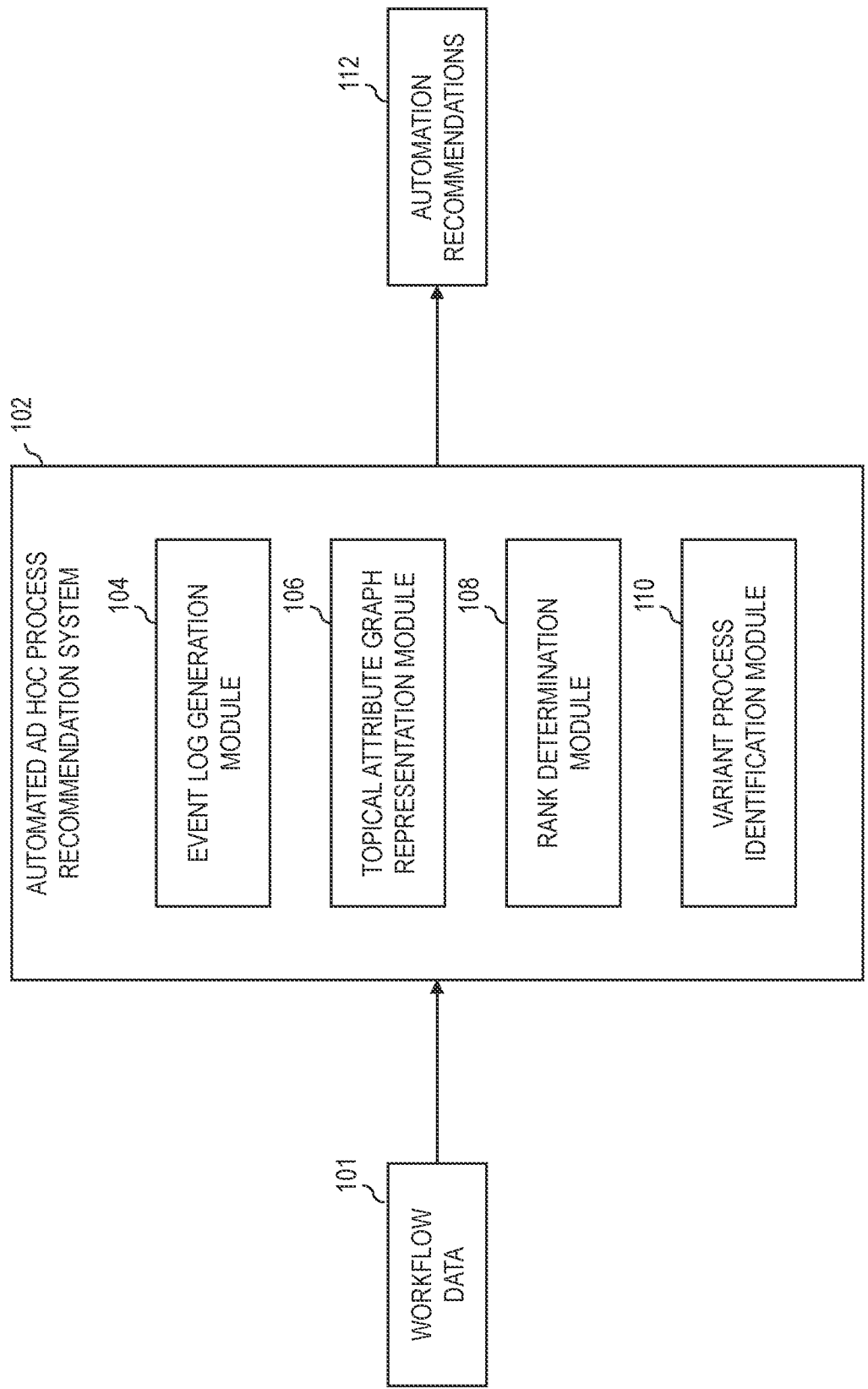
FIG. 1 is a diagram illustrating a system architecture in accordance with exemplary embodiments.

FIG. 1 is a diagram illustrating a system architecture in accordance with exemplary embodiments. More specifically, FIG. 1 depicts an automated ad hoc process recommendation system 102 comprising an event log generation module 104, a topical attribute graph representation module 106, a rank determination module 108, and a variant process identification module 110. Generally, the automated ad hoc process recommendation system 102 obtains workflow data 101 and automatically generates automation recommendations 112.

By way of example, the workflow data 101 can include ad hoc task recordings from one or more workflow tools. The workflow data 101 in some embodiments, can be structured data, unstructured data, and/or lifecycle data.

The event log generation module 104 generates event logs using one or more of: ad hoc process descriptions and ad hoc task descriptions from the workflow data 101. The topical attribute graph representation module 106 learns embeddings of attributed process flow graphs from the event logs. The rank determination module 108, in some embodiments, ranks the topical process flow graphs using one or more structural complexity measures, and scores the attributed process flow graphs based on how suitable the process is for automation. For example, candidates can be amenable for automation based on the complexity of the process and/or a number of outliers in the activity durations. The variant process identification module 110 identifies candidate process variants for automation. The automation recommendations 112 can include one or more of the identified process variants. These and other features of the automated ad hoc process recommendation system 102, are explained in further detail herein.

Figure 2:
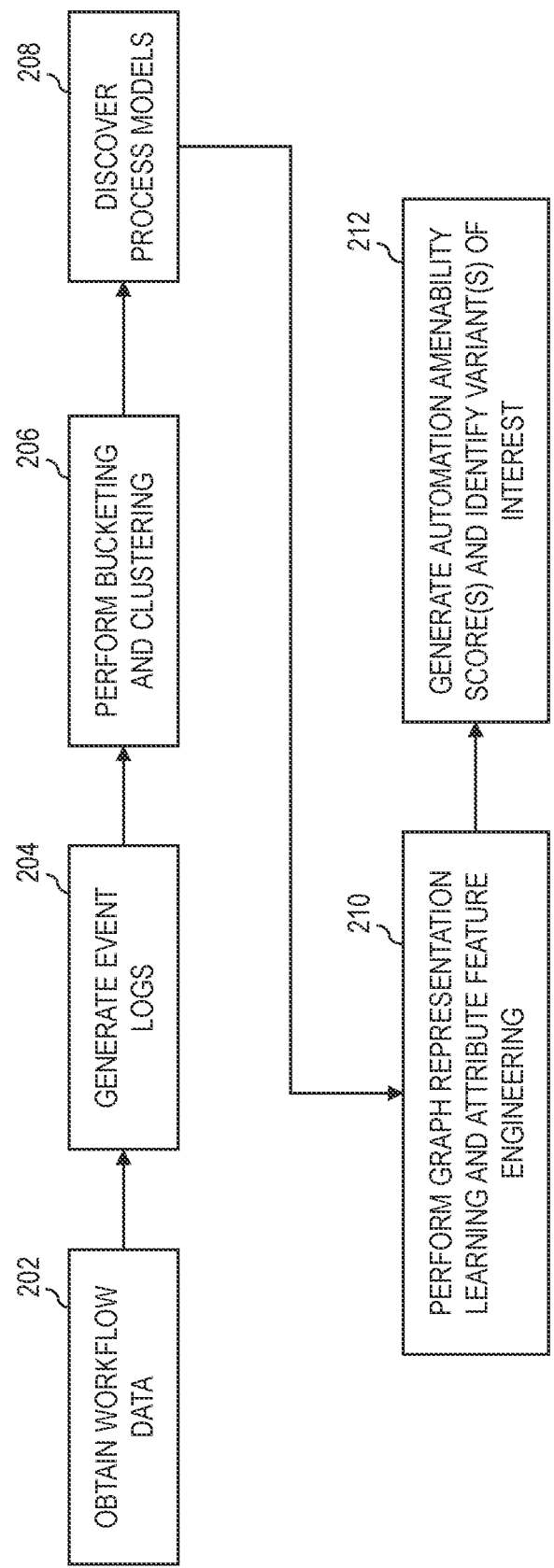
FIG. 2 shows a flow diagram of a process in accordance with exemplary embodiments.

Referring now to FIG. 2, this figure shows a flow diagram of a process in accordance with exemplary embodiments. In some embodiments the process depicted in FIG. 2 can be performed by the automated ad hoc process recommendation system 102. Step 202 includes obtaining workflow data (for example, form one or more workflow tools). Step 204 includes generating event logs using the task descriptions corresponding to the workflow data and one or more language models. In some embodiments, the event logs may include records that include an identifier, a task, and a timestamp.

In some embodiments, step 204 can include generating vector representations of the task descriptions, and updating pre-trained embeddings using domain specific training data from the ad hoc task descriptions in the workflow data 101, for example. When tuning the sentence embeddings, the event log generation module 104 can use the task sequence for a process instance as a context. Accordingly, the embeddings can capture the semantics of task descriptions in the context of a task sequence of a process instance. Those skilled in the art will appreciate that different techniques can be used to tune pre-trained sentence embeddings for a particular domain, to semantically cluster the embeddings, and to generate the keyphrases.

Keyphrase extraction processes attempt to automatically select important and topical phrases from a body of text. Such extraction processes can include supervised and unsupervised approaches. In a supervised approach, a model is trained to classify a candidate keyphrase and uses labeled keyphrases as training data. Unsupervised techniques can include: graph-based ranking, topic-based clustering, simultaneous learning, and language modeling, for example. Graph-based ranking methods generally build a graph from an input document or text, and nodes in the graph are ranked based on their importance to select the most relevant keyphrases. In one example, a keyphrase algorithm may first identify a list of candidate keyphrases from the set of documents and then select the top n-ranked keyphrases for the output by using a ranking criterion. The ranked keyphrases are then postprocessed to be adapted according to a specified domain.

Figure 3:
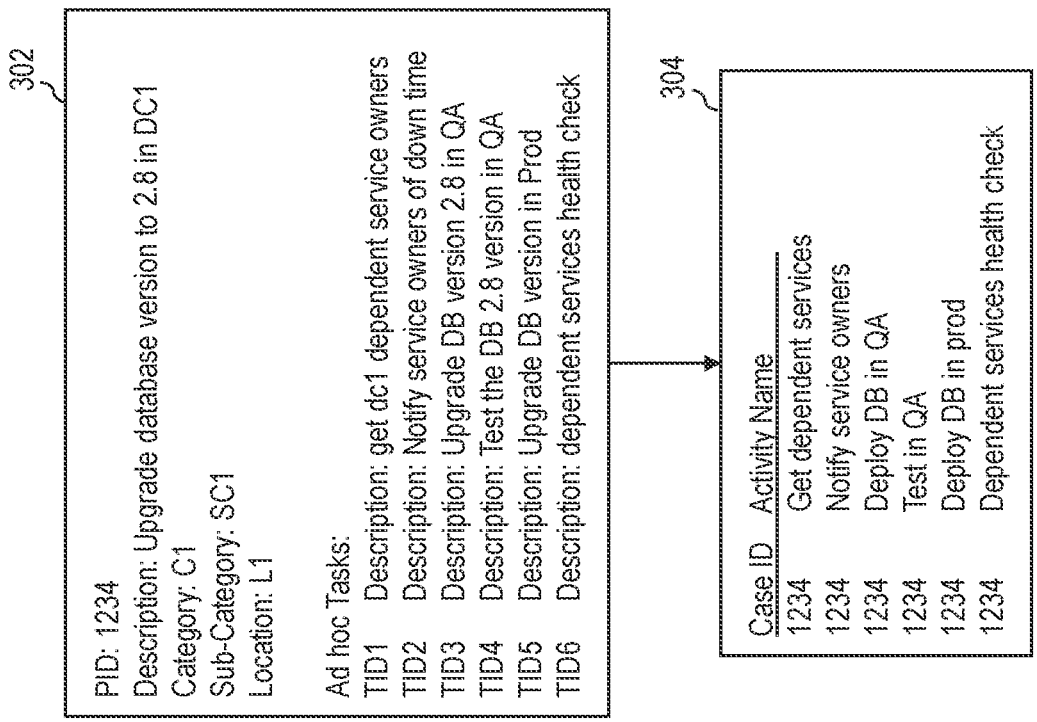
FIG. 3 shows an example of an event log generated from ad hoc task data in accordance with exemplary embodiments.

Referring also to FIG. 3, this figure shows an example of ad hoc task data 302 and an event log 304 generated in accordance with exemplary embodiments. The event log 304 can be the output of step 204 of the process in FIG. 2, for example. The ad hoc task data 302, in this example, includes a process identifier ("1234"), a description ("Upgrade database version to 2.8 in DC1"), a category ("C1"), a sub-category ("SC1"), a location ("L1") and a list of ad hoc tasks with corresponding identifies (TID1-TID6). The event log 304 includes activity names corresponding to the ad hoc tasks that are linked to a case ID. The event log 304 may include additional fields in some embodiments, such as start and complete timestamps for each of the activities and contextual factors (meta-attributes) corresponding to the location, category, and/or subcategory, for example.

Referring again to FIG. 2, step 206 includes performing a bucketing and clustering process on the event logs. For example, the bucketing and clustering process performing a semantic clustering process on the task embeddings (or vectors) generated at step 204. Also, step 206 can include performing an activity name generation process to generate names for the activities corresponding to the tasks. For example, a keyphrase generation model and/or generative techniques (such as Key2Vec) can be applied to generate keyphrases to represent the cluster members.

Step 208 includes discovering a process model for each of the identified clusters using a process mining tool, for example. The process models can be in the form of a graph comprising a set of nodes that represent different tasks of a process, and the edges indicating the order the task are performed. Each edge can also be labeled with the duration of the respective tasks. In some embodiments, steps 206 and 208 can include the following topical process flow graph mining process:

1. Identifying parent-child relationships from structured data attributes in the generated event logs and determine one or more buckets;
2. Identifying topic clusters from the event logs using case descriptions; and
3. Mining the process flow graph for each of the clusters using the respective event logs.

As an example, the resulting clusters can correspond to the following topics: "cannot create new orders," "cannot access UI," and "cannot make payments." Each cluster can be represented as a topical process model.

Step 210 includes performing graph representation learning and attribute feature engineering on the topical process models. For example, step 210 can include obtaining the discovered process models and the event logs with the cluster labels and identifying features of the topical process models for a given cluster. In at least some embodiments, the attribute feature engineering may include identifying at least one of: one or more structural features (for example, a number of edges, a number of nodes, a maximum node fan-out count, a maximum node fan-in count, a number of variants, and/or a number of loops), frequency distribution features (for example, a skewness of variant frequencies) and/or temporal distribution features (for example, node criticality score and/or loop fraction).

The loop fraction may be computed as the total average distribution in loops/average total distribution. Also, the node criticality score (NCS), in some embodiments, may be a function of central tendency, spread (or variability) of the temporal distribution, and frequency. The temporal distribution can correspond to a temporal criticality score (TCS), and the frequency can correspond to a cluster membership score (CMS). The CMS is a normalized score that defines the frequency of an activity/node across all the clusters. CMS is calculated for all the nodes in a cluster, and high CMS suggests that an activity is highly critical or amenable to automation. Nodes corresponding to a "stop" activity can be filtered out. NCS can be calculated, for example, based on the following equation: NCS=w1*CMS+w2*TCS, where w1 and w2 are system dependent.

Step 212 includes generating automation amenability scores and identifying variants of interest for one or more of the process models. Generally, the automation amenability score can help identify topical processes which are amenable for RPA-based automation. In some embodiments, step 212 includes applying the following scoring function to compute automation amenability scores, which can be used to sort the topical process graphs for automation amenability:

$$(w1*n\_variants+w2*NCS+w3*n\_similar\_topical\_processses)/(y1*n\_nodes+y2*n\_edges+y3*n\_max\_fanout+y4*n\_max\_fanin+y5*n\_loops+y6*n\_loop\_fraction)$$

The function above provides an automation amenability score, which is higher for processes that have simpler structures and have skewness in distribution of variants and bottleneck activities. Generally, a higher score indicates the process is more amenable for automation than a process having a lower score.

Variants of interest, in some embodiments, are identified by: (i) identifying activities of interest (for example, activities which have a maximum average time and occur in multiple processes in a given cluster and/or activities which have tighter distribution of duration across process members); and (ii) identifying variants of interest for an event attribute using, for example, a process that splits any other (combination of) event attributes.

In some embodiments, a graph embedding and clustering process of attributed process flow graphs can include the following steps:
1. Applying one or more graph embedding techniques (for example, Graph2Vec) to obtain vector representation of structure of topical process flow graph;
2. Applying one or more document embedding techniques (for example, doc2vec) to obtain embeddings of attributes features of process flow graphs;
3. Concatenating the resulting embedding from steps 1 and 2 to obtain attributed process graph embeddings; and
4. Applying a clustering technique on the embeddings from step 3 to obtain similar process flow graphs.

Figure 4:
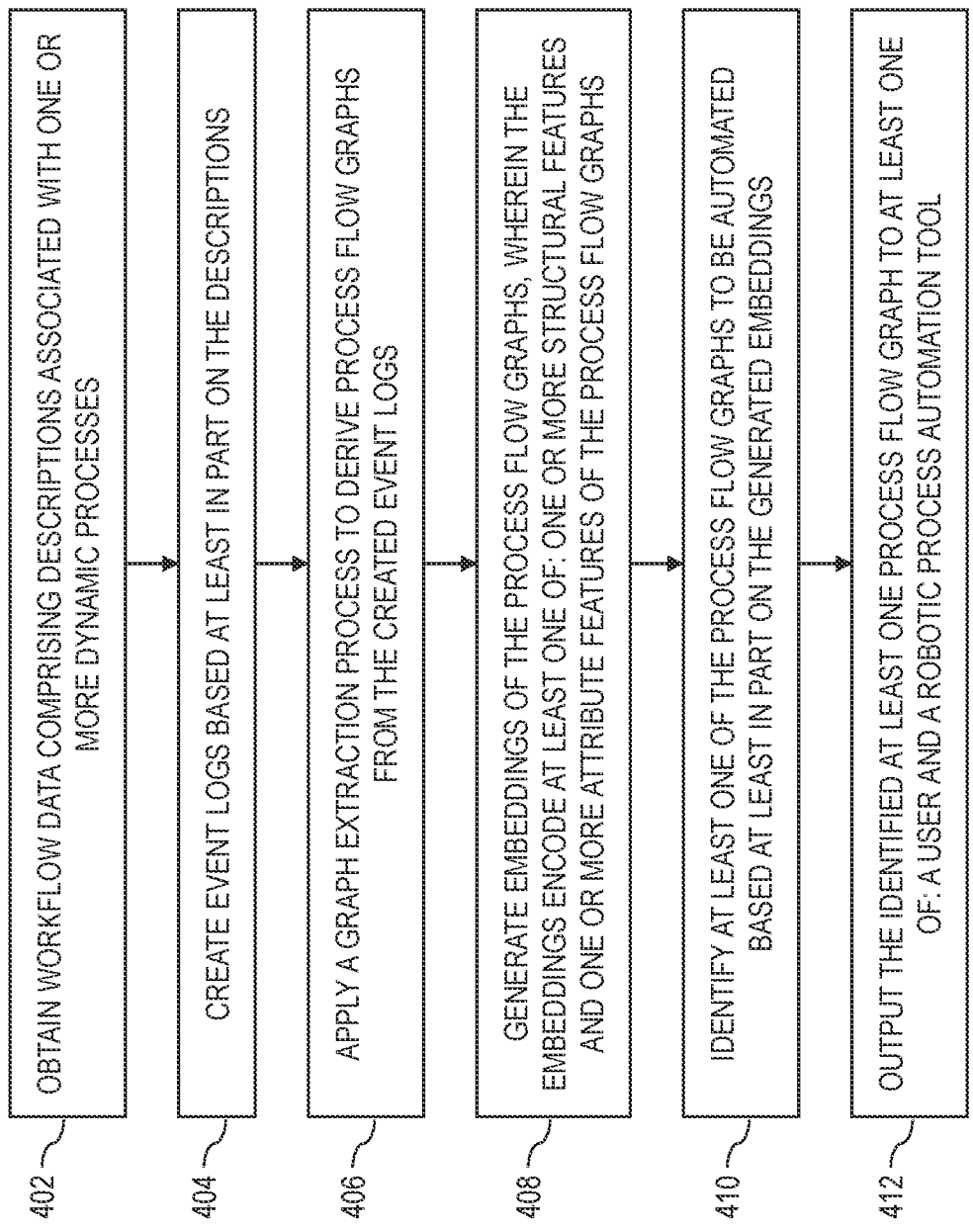
FIG. 4 is a flow diagram illustrating techniques for generating automation recommendations for ad hoc processes in accordance with exemplary embodiments.

FIG. 4 is a flow diagram illustrating techniques in accordance with exemplary embodiments. Step 402 includes obtaining workflow data comprising descriptions associated with one or more dynamic processes. Step 404 includes creating event logs based at least in part on the descriptions. Step 406 includes applying a graph extraction process to derive process flow graphs from the created event logs. Step 408 includes generating embeddings of the process flow graphs, wherein the embeddings encode at least one of: one or more structural features and one or more attribute features of the process flow graphs. Step 410 includes identifying at least one of the process flow graphs to be automated based at least in part on the generated embeddings. Step 412 includes outputting the identified at least one process flow graph to at least one of: a user and a robotic process automation tool.

The one or more dynamic processes may include one or more ad hoc processes. The process depicted FIG. 4 may include in response to the outputting, using the robotic process automation tool to automatically perform a process corresponding to the identified at least one of the process flow graphs. The identifying may include: applying at least one unsupervised machine learning technique to cluster the process flow graphs into one or more clusters. The descriptions associated with the one or more dynamic processes may include at least one of: one or more task descriptions; and one or more process descriptions. The creating may include: generating vector representations of the descriptions; performing a semantic clustering process that assigns similar vector representations to a same one of a plurality of a clusters; and generating a keyphrase to represent each of the plurality of clusters. Each the one or more features may include at least one of: a structural feature, a temporal feature, and a frequency distribution feature. The structural feature may include one or more of: a number of edges; a number of nodes; a maximum node fan-out count; a maximum node fan-in count; a number of variants; and a number of loops. The identifying may include: computing automation scores for the process flow graphs based at least in part on the encoded features, wherein the automation scores indicate a complexity of automating the process flow graphs; and ranking the process flow graphs based on the computed automation scores. The identifying may include: generating and outputting at least one variant of a given one of the process flow graphs, wherein generating the at least one variant comprises at least one of: adding, deleting, or changing one or more task associated with the process flow graph based at least in part on the features of one or more other process flow graphs.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Additionally, an embodiment of the present disclosure can make use of software running on a computer or workstation.

Figure 5:
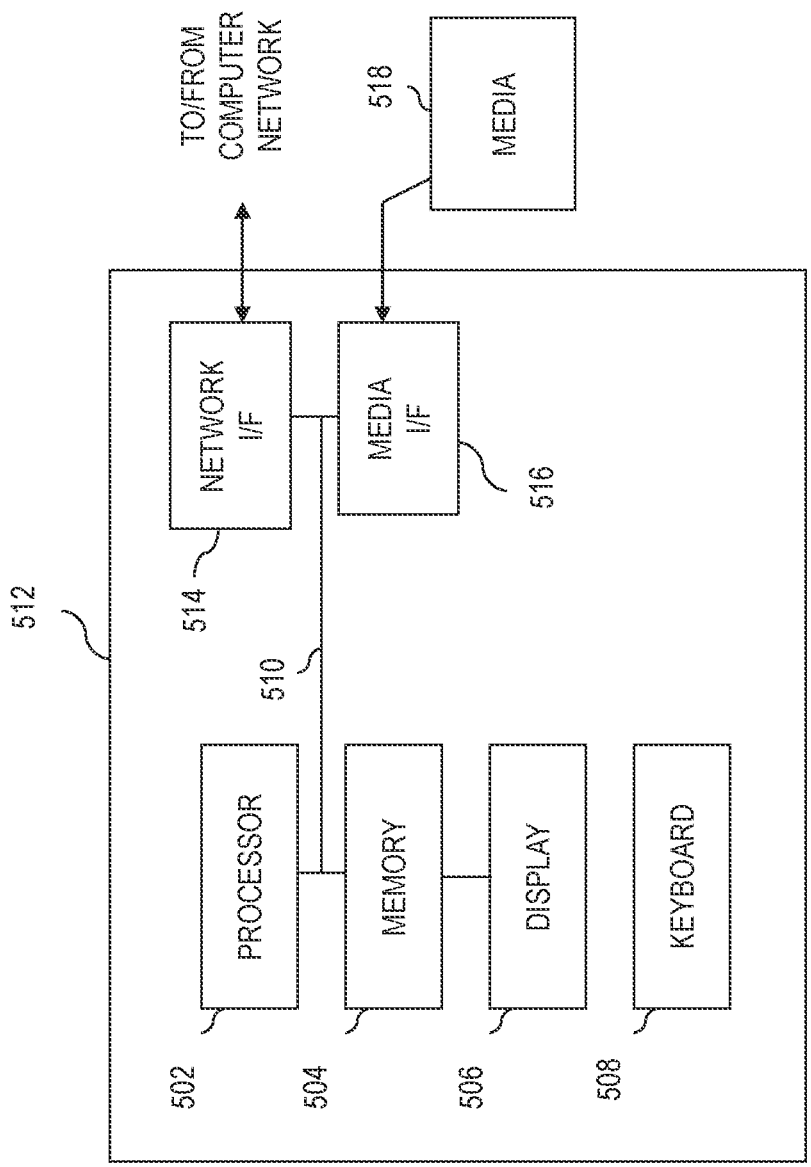
FIG. 5 is a system diagram of an exemplary computer system on which at least one embodiment of the present disclosure can be implemented.

With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls). Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
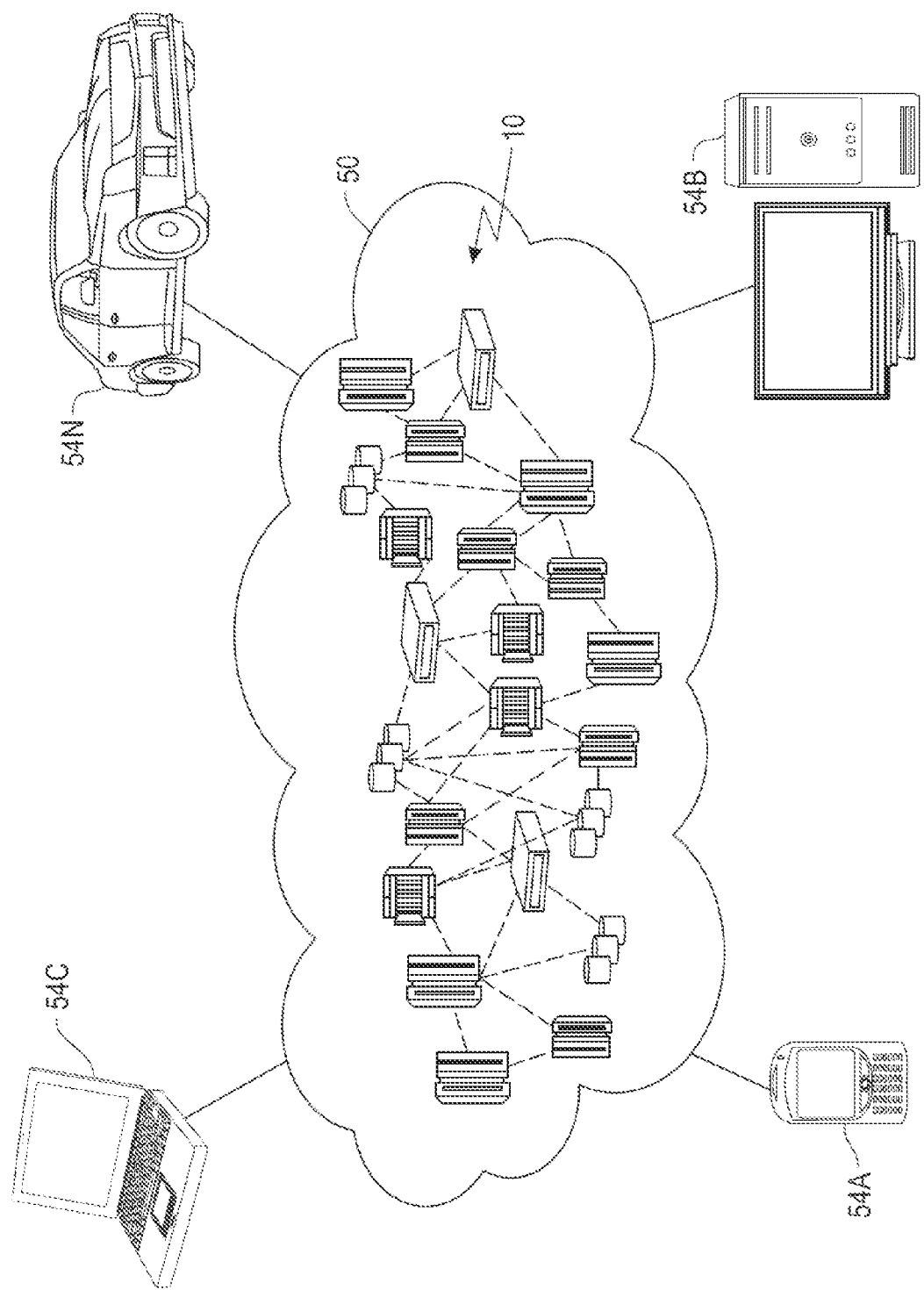
FIG. 6 depicts a cloud computing environment in accordance with exemplary embodiments.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (for example, using a web browser).

Figure 7:
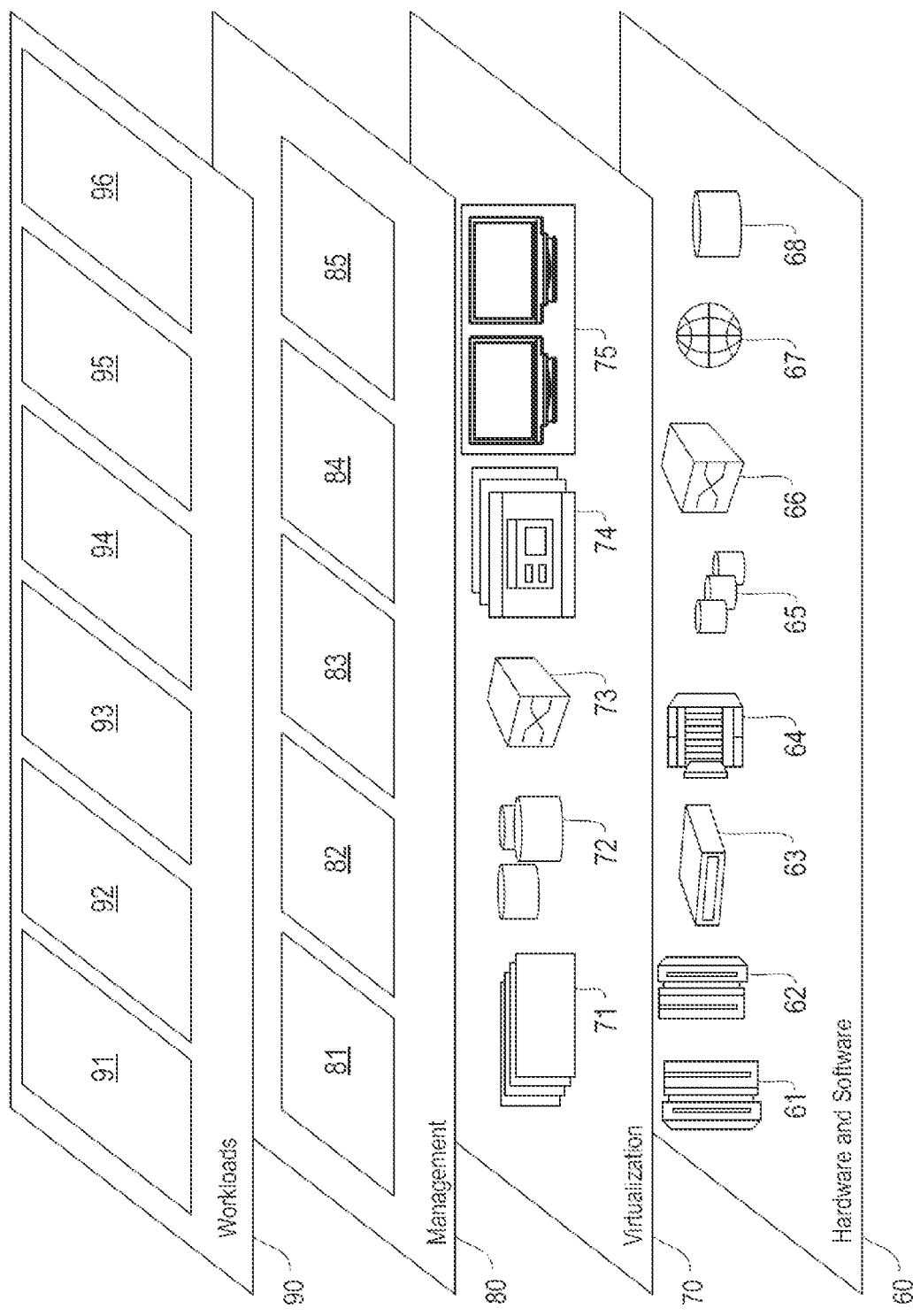
FIG. 7 depicts abstraction model layers in accordance with exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automation recommendations for ad hoc processes 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, automatically generating automation recommendations for ad hoc processes.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for improving automated process discovery by generating an executable process variant from unstructured textual data, the method comprising:
   obtaining, by at least one computing device, workflow data associated with one or more dynamic processes, wherein the workflow data comprise unstructured textual data corresponding to at least one of textual descriptions of the one or more dynamic processes and textual descriptions of one or more ad hoc tasks corresponding to the one or more dynamic processes;
   creating, by the at least one computing device, event logs based at least in part on the textual descriptions;
   applying, by the at least one computing device, a graph extraction process to derive process flow graphs from the created event logs, wherein the process flow graphs comprise nodes corresponding to the one or more ad hoc tasks and edges indicating at least one of an order and a duration of the one or more ad hoc tasks;
   executing, by the at least one computing device, a first machine learning embedding process, wherein the first machine learning embedding process generates a first set of vector embeddings by processing the process flow graphs to encode a plurality of structural features of the process flow graphs, the plurality of structural features comprising at least a number of nodes and a number of edges;
   executing, by the at least one computing device, a second machine learning embedding process, wherein the second machine learning embedding process generates a second set of vector embeddings by processing the textual descriptions, wherein the second set of vector embeddings encode one or more semantic features of the textual descriptions;
   generating, by the at least one computing device, a unified set of attributed process graph vector embeddings by combining, for each process flow graph, the corresponding vector embedding encoding the plurality of structural features with the corresponding vector embedding encoding the one or more semantic features;
   applying, by the at least one computing device, at least one unsupervised machine learning process to the unified set of attributed process graph vector embeddings to cluster the process flow graphs into one or more clusters;
   computing, by the at least one computing device, automation scores for the process flow graphs based at least in part on the unified set of attributed process graph vector embeddings, wherein the automation scores indicate a complexity of automating the process flow graphs;
   identifying, by the at least one computing device, at least one of the process flow graphs to be automated based at least in part on the computed automation scores;
   generating, by the at least one computing device, at least one executable process variant of the identified at least one process flow graph, the executable process variant comprising a new process flow graph comprising a modified sequence of computer-executable tasks, wherein generating the at least one executable process variant comprises: (i) identifying a portion of the identified at least one process flow graph corresponding to an activity based on a comparison of an average time to perform the activity relative to other activities within a given one of the one or more clusters comprising the identified at least one process flow graph and a frequency of occurrence of the activity across multiple process flow graphs within the cluster, and (ii) modifying the identified portion based on the plurality of structural features and the one or more semantic features encoded in the attributed process graph vector embeddings corresponding to at least one other process flow graph within the cluster;
   outputting, by the at least one computing device, the generated at least one executable process variant to a robotic process automation tool; and
   in response to the outputting, using, by the at least one computing device, the robotic process automation tool to automatically execute the modified sequence of computer-executable tasks of the at least one executable process variant.

2. The computer-implemented method of claim 1, further comprising:
   generating, by the at least one computing device, a respective keyphrase to represent each of the one or more clusters based on the textual descriptions associated with the process flow graphs within each cluster.

3. The computer-implemented method of claim 1, wherein the first set of vector embeddings of the process flow graphs generated by the first machine learning embedding process further encode one or more of: at least one temporal feature, and at least one frequency distribution feature.

4. The computer-implemented method of claim 1, wherein the plurality of structural features further comprises one or more of:
   a maximum node fan-out count;
   a maximum node fan-in count;
   a number of variants; and
   a number of loops.

5. The computer-implemented method of claim 1, wherein the identifying comprises:
   ranking the process flow graphs based on the computed automation scores.

6. The computer-implemented method of claim 1, wherein generating the at least one executable process variant comprises at least one of: adding, deleting, or changing one or more repetitive tasks associated with the identified process flow graph.

7. A computer program product for improving automated process discovery by generating an executable process variant from unstructured textual data, the computer program product comprising a computer readable storage medium having program instructions embodied therewith, the program instructions executable by a computing device to cause the computing device to:
   obtain workflow data associated with one or more dynamic processes, wherein the workflow data comprise unstructured data corresponding to at least one of textual descriptions of the one or more dynamic processes and textual descriptions of one or more ad hoc tasks corresponding to the one or more dynamic processes;

create event logs based at least in part on the textual descriptions;
apply a graph extraction process to derive process flow graphs from the created event logs, wherein the process flow graphs comprise nodes corresponding to the one or more ad hoc tasks and edges indicating at least one of an order and a duration of the one or more ad hoc tasks;
   execute a first machine learning embedding process, wherein the first machine learning embedding process generates a first set of vector embeddings by processing the process flow graphs to encode a plurality of structural features of the process flow graphs, the plurality of structural features comprising at least a number of nodes and a number of edges;
   execute a second machine learning embedding process, wherein the second machine learning embedding process generates a second set of vector embeddings by processing the textual descriptions, wherein the second set of vector embeddings encode one or more semantic features of the textual descriptions;
   generate a unified set of attributed process graph vector embeddings by combining, for each process flow graph, the corresponding vector embedding encoding the plurality of structural features with the corresponding vector embedding encoding the one or more semantic features;
   apply at least one unsupervised machine learning process to the unified set of attributed process graph vector embeddings to cluster the process flow graphs into one or more clusters;
   compute automation scores for the process flow graphs based at least in part on the unified set of attributed process graph vector embeddings, wherein the automation scores indicate a complexity of automating the process flow graphs;
   identify at least one of the process flow graphs to be automated based at least in part on the computed automation scores;
   generate at least one executable process variant of the identified at least one process flow graph, the executable process variant comprising a new process flow graph comprising a modified sequence of computer-executable tasks, wherein generating the at least one executable process variant comprises: (i) identifying a portion of the identified at least one process flow graph corresponding to an activity based on a comparison of an average time to perform the activity relative to other activities within a given one of the one or more clusters comprising the identified at least one process flow graph and a frequency of occurrence of the activity across multiple process flow graphs within the cluster, and (ii) modifying the identified portion based on the plurality of structural features and the one or more semantic features encoded in the attributed process graph vector embeddings corresponding to at least one other process flow graph within the cluster;
   output the generated at least one executable process variant to a robotic process automation tool; and
   in response to the outputting, use the robotic process automation tool to automatically execute the modified sequence of computer-executable tasks of the at least one executable process variant.

8. The computer-implemented method of claim 1, wherein executing the second machine learning embedding process comprises:
   updating pre-trained sentence embeddings using domain-specific training data derived from the textual descriptions of the one or more ad hoc tasks.

9. The computer-implemented method of claim 8, wherein updating the pre-trained sentence embeddings comprises tuning the pre-trained sentence embeddings using a task sequence of a process instance associated with the textual descriptions as a context.

10. The computer program product of claim 7, wherein the computing device is further caused to:
   generate a respective keyphrase to represent each of the one or more clusters based on the textual descriptions associated with the process flow graphs within each cluster.

11. The computer program product of claim 7, wherein the first set of vector embeddings of the process flow graphs generated by the first machine learning embedding process further encode one or more of: at least one temporal feature, and at least one frequency distribution feature.

12. The computer program product of claim 7, wherein the identifying comprises:
   ranking the process flow graphs based on the computed automation scores.

13. The computer program product of claim 7, wherein executing the second machine learning embedding process comprises:
   updating pre-trained sentence embeddings using domain-specific training data derived from the textual descriptions of the one or more ad hoc tasks, wherein updating the pre-trained sentence embeddings comprises tuning the pre-trained sentence embeddings using a task sequence of a process instance associated with the textual descriptions as a context.

14. A system for improving automated process discovery by generating an executable process variant from unstructured textual data, the system comprising:
   a memory configured to store program instructions;
   a processor operatively coupled to the memory to execute the program instructions to:
   obtain workflow data associated with one or more dynamic processes, wherein the workflow data comprise unstructured data corresponding to at least one of textual descriptions of the one or more dynamic processes and textual descriptions of one or more ad hoc tasks corresponding to the one or more dynamic processes;
   create event logs based at least in part on the textual descriptions;
   apply a graph extraction process to derive process flow graphs from the created event logs, wherein the process flow graphs comprise nodes corresponding to the one or more ad hoc tasks and edges indicating at least one of an order and a duration of the one or more ad hoc tasks; execute a first machine learning embedding process, wherein the first machine learning embedding process generates a first set of vector embeddings by processing the process flow graphs to encode a plurality of structural features of the process flow graphs, the plurality of structural features comprising at least a number of nodes and a number of edges;
   execute a second machine learning embedding process, wherein the second machine learning embedding process generates a second set of vector embeddings by processing the textual descriptions, wherein the second set of vector embeddings encode one or more semantic features of the textual descriptions;

generate a unified set of attributed process graph vector embeddings by combining, for each process flow graph, the corresponding vector embedding encoding the plurality of structural features with the corresponding vector embedding encoding the one or more semantic features;

apply at least one unsupervised machine learning process to the unified set of attributed process graph vector embeddings to cluster the process flow graphs into one or more clusters;

compute automation scores for the process flow graphs based at least in part on the unified set of attributed process graph vector embeddings, wherein the automation scores indicate a complexity of automating the process flow graphs;

identify at least one of the process flow graphs to be automated based at least in part on the computed automation scores;

generate at least one executable process variant of the identified at least one process flow graph, the executable process variant comprising a new process flow graph comprising a modified sequence of computer-executable tasks, wherein generating the at least one executable process variant comprises: (i) identifying a portion of the identified at least one process flow graph corresponding to an activity based on a comparison of an average time to perform the activity relative to other activities within a given one of the one or more clusters comprising the identified at least one process flow graph and a frequency of occurrence of the activity across multiple process flow graphs within the cluster, and (ii) modifying the identified portion based on the plurality of structural features and the one or more semantic features encoded in the attributed process graph vector embeddings corresponding to at least one other process flow graph within the cluster;

output the generated at least one executable process variant to a robotic process automation tool; and in response to the outputting, use the robotic process automation tool to automatically execute the modified sequence of computer-executable tasks of the at least one executable process variant.

15. The system of claim 14, wherein the processor further executes the program instructions to:

generate a respective keyphrase to represent each of the one or more clusters based on the textual descriptions associated with the process flow graphs within each cluster.

16. The system of claim 14, wherein the first set of vector embeddings of the process flow graphs generated by the first machine learning embedding process further encode one or more of: at least one temporal feature, and at least one frequency distribution feature.

17. The system of claim 14, wherein the plurality of structural features further comprises one or more of:

a maximum node fan-out count;
a maximum node fan-in count;
a number of variants; and
a number of loops.

18. The system of claim 14, wherein the identifying comprises:

ranking the process flow graphs based on the computed automation scores.

19. The system of claim 14, wherein generating the at least one executable process variant comprises at least one of: adding, deleting, or changing one or more repetitive tasks associated with the identified process flow graph.

20. The system of claim 14, wherein executing the second machine learning embedding process comprises:

updating pre-trained sentence embeddings using domain-specific training data derived from the textual descriptions of the one or more ad hoc tasks, wherein updating the pre-trained sentence embeddings comprises tuning the pre-trained sentence embeddings using a task sequence of a process instance associated with the textual descriptions as a context.

* * * * *